US005808926A

United States Patent [19]
Gorshtein et al.

[11] Patent Number: 5,808,926
[45] Date of Patent: Sep. 15, 1998

[54] FLOATING POINT ADDITION METHODS AND APPARATUS

[75] Inventors: Valery Y. Gorshtein; Anatoly I. Grushin; Sergey R. Shevtsov, all of Moscow, Russian Federation

[73] Assignee: Sun Microsystems, Inc., Palo Alto, Calif.

[21] Appl. No.: 717,653

[22] Filed: Sep. 24, 1996

Related U.S. Application Data

[63] Continuation of PCT/RU96/00209, Aug. 5, 1996, which is a continuation-in-part of Ser. No. 457,336, Jun. 1, 1995.

[51] Int. Cl.$^6$ .................................. G06F 7/42; G06F 7/38
[52] U.S. Cl. .................................. 364/748.11; 364/748.03
[58] Field of Search .............................. 364/748, 715.04, 364/745, 748.03, 748.11, 745.2

[56] References Cited

U.S. PATENT DOCUMENTS

| H1222 | 8/1993 | Brown et al. . |
| 4,217,657 | 8/1980 | Handly et al. . |
| 4,777,613 | 10/1988 | Shahan et al. . |

(List continued on next page.)

FOREIGN PATENT DOCUMENTS

| A12689989 | 10/1993 | France . |
| A 1549478 | 8/1970 | Germany . |
| A12941594 | 4/1980 | Germany . |
| 2006915 C1 | 1/1994 | Russian Federation . |
| A 763892 | 9/1980 | U.S.S.R. . |
| A 809169 | 3/1981 | U.S.S.R. . |
| A11259248 | 9/1986 | U.S.S.R. . |

OTHER PUBLICATIONS

Omondi, Amos R., "Computer Arithmetic Systems: Algorithms, Architecture and Implementations", (Prentice–Hall International (UK) Limited, 1994), pp. 76–86.

Yu, Robert K., et al., "167 MHz Radix–4 Floating Point Multiplier", Proceedings of the Twelfth Symposium on Computer Arithmetic (IEEE 1995), pp. 149–154.

Benschneider, et al., "A Pipelined 50–MHz CMOS 64–bit Floating–Point Arithmetic Processor", *IEEE Journal of Solid–State Circuits,* vol. 24, No. 5, Oct. 1989, pp. 1317–1323.

Quach, et al., "An Improved Algorithm for High–Speed Floating–Point Addition", Stanford University Technical Report No. CSL–TR–90–442, Aug. 1990, pp. 1–17.

Hokenek, et al., "Second–Generation RISC Floating Point with Multiply–Add Fused", *IEEE Journal of Soldi–State Circuits,* vol. 25, No. 5, Oct. 1990, pp. 1207–1213.

Ide, et al., "A 320–MFLOPS CMOS Floating–Point Processing Unit for Superscalar Processors", *IEEE Journal of Solid–State Circuits,* vol. 28, No. 3, Mar. 1993, pp. 352–361.

(List continued on next page.)

*Primary Examiner*—Tan V. Mai
*Attorney, Agent, or Firm*—Skjerven, Morrill, MacPherson, Franklin & Friel; Michael Shenker

[57] ABSTRACT

A floating point addition unit includes two subunits each of which performs the addition. One subunit ("rounding subunit") rounds the addition result, and the other subunit ("non-rounding subunit") does not. The result of the rounding subunit is selected as the addition result when one of the following conditions (R1), (R2), (R3) is true: (R1) the operation is an effective addition; (R2) the operation is an effective subtraction, the magnitude ED of the difference between the exponents of the operands is 1, and normalization of the result is not required; (R3) the operation is an effective subtraction and ED>1. The addition result is selected from the non-rounding subunit in the remaining cases. In some embodiments, the rounding subunit overlaps rounding with adding the operands, significands. In some embodiments, the addition unit satisfies ANSI/IEEE Standard 754-1985.

26 Claims, 10 Drawing Sheets

U.S. PATENT DOCUMENTS

| | | |
|---|---|---|
| 4,839,846 | 6/1989 | Hirose et al. . |
| 4,926,369 | 5/1990 | Hokenek et al. ........................ 364/748 |
| 4,926,370 | 5/1990 | Brown et al. ...................... 364/748.03 |
| 4,941,120 | 7/1990 | Brown et al. . |
| 4,977,535 | 12/1990 | Birger ................................ 364/748.03 |
| 5,117,384 | 5/1992 | Drehmel et al. . |
| 5,136,536 | 8/1992 | Ng .......................................... 364/748 |
| 5,204,825 | 4/1993 | Ng . |
| 5,241,490 | 8/1993 | Poon . |
| 5,247,471 | 9/1993 | Hilker et al. . |
| 5,257,215 | 10/1993 | Poon . |
| 5,260,889 | 11/1993 | Palaniswami . |
| 5,267,186 | 11/1993 | Gupta et al. . |
| 5,272,660 | 12/1993 | Rossbach . |
| 5,282,156 | 1/1994 | Miyoshi et al. ........................ 364/748 |
| 5,301,139 | 4/1994 | Zinger . |
| 5,310,134 | 5/1994 | Hsu et al. . |
| 5,317,527 | 5/1994 | Britton et al. . |
| 5,337,265 | 8/1994 | Desrosiers et al. . |
| 5,343,413 | 8/1994 | Inoue ................................ 364/715.04 |
| 5,357,455 | 10/1994 | Sharangpani et al. . |
| 5,369,607 | 11/1994 | Okamoto ................................ 364/748 |
| 5,390,134 | 2/1995 | Heikes et al. . |
| 5,463,574 | 10/1995 | Desrosiers et al. . |
| 5,481,686 | 1/1996 | Dockser . |
| 5,483,476 | 1/1996 | Horen et al. ............................ 364/748 |
| 5,493,520 | 2/1996 | Schmookler et al. . |
| 5,504,912 | 4/1996 | Morinaga et al. . |
| 5,511,016 | 4/1996 | Béchade . |
| 5,528,525 | 6/1996 | Suzuki . |
| 5,568,412 | 10/1996 | Han et al. ............................... 364/748 |

OTHER PUBLICATIONS

*Encyclopedia of Computer Science & Engineering,* Second Edition, Van Nostrand Reinhold Co., New York, NY, 1983, pp. 98–102, 1322–1324.

Gwennap, et al., "UltraSparc Unleashes SPARC Performance, Next–Generation Design Could Put Sun Back in Race" *Microprocessor Report,* vol. 8, No. 13, Oct. 3, 1994, pp. 1–10.

Hokenek et al., "Leading–Zero Anticipator (LZA) in the IBM RISC Systemn/6000 Floating–Point Execution Unit," *IBM J. Res. Develop.,* vol. 34, No. 1, Jan., 1990, pp. 71–77.

Montoye, et al., "Design of the IBM RISC System/6000 Floating Point Execution Unit," *IBM J. Res. Develop.,* vol. 34, No. 1, Jan. 1990, pp. 59–70.

LSI Logic Databook and Design Manual, 5th Ed., HCMOS Macrocells, Macrofunctions, Oct. 1986, pp. 12–1 to 12–28.

Quach et al., "Leading One Prediction — Implementation, Generalization, and Application, Technical Report: CSL–TR–91–463," Computer Systems Laboratory, Stanford University, Mar. 1991, pp.1–12.

"IEEE Standard for Binary Floating–Point Arithmetic," Institute of Electrical and Electronics Engineers, Inc., New York, NY, ANSI/IEEE Std. 754, Nov. 1994, pp. 1–18.

"IC Master 3. Advertisers Technical Data; LSI Logic Products and Services," *Hearst Business Communications, Inc.,* IC Master, 1991, pp. 3529–3532.

The SPARC Architecture Manual, Version 8, (SPARC International, Inc., Prentice–Hall, Inc., New Jersery, 1992), pp. 1–316.

Kahan, W., et al., "A Porposed IEEE–CS Standard for Binary Floating Point Arithmetic", Proceedings of the Computer Science and Statistics: 12th Annual Symposium on the Interface, May 10–11, 1979, University of Waterloo, Waterloo, Ontario, Canada, pp. 32–36.

Weste, Neil H.E., et al., "Principles of CMOS VLSI Design — Systems Perspective" (Addison–Wesley Publishing Co., 2nd Ed., 1993), p. 532.

Hicks, T.N., et al., "POWER2 Floating–Point Unit: Architecture and Implementation", *IBM J. Res. Develop.,* vol. 38, No. 5, Sep. 1994, pp. 525–536.

FLOATING POINT ADDITION METHODS AND APPARATUS

The present application is a continuation of PCT application No. PCT/RU96/00209 designating the United States of America, filed Aug. 5, 1996 by V. Y. Gorshtein et al. and entitled "FLOATING POINT ADDITION METHODS AND APPARATUS". The present application is a continuation-in-part of U.S. patent application Ser. No. 08/457,336 filed Jun. 1, 1995 by A. I. Grushin et al, and entitled "COMPUTER METHODS AND APPARATUS FOR ELIMINATING LEADING NON-SIGNIFICANT DIGITS IN FLOATING POINT COMPUTATIONS".

BACKGROUND OF THE INVENTION

The present invention relates to computers, and more particularly to performing floating point operations by computers.

The result of a floating point operation may have to be rounded to fit into a limited number of bits allocated for the result in the computer. Rounding introduces an undesirable delay into the floating point operation.

For floating point addition, it has been proposed to perform rounding "approximately simultaneously" with the addition of the operands' fractions. See U.S. Pat. No. 5,390,134 issued Feb. 14, 1995 to Heikes et al. If rounding overlaps with the addition of the fractions, the delay due to rounding becomes reduced. See also N. T. Quach and M. J. Flynn, "An Improved Algorithm for High-Speed Floating-Point Addition", Technical Report CSL-TR-90-442 (Aug., 1990).

It is desirable to provide low delay (i.e. low latency) floating point addition units which overlap rounding with the addition of fractions.

SUMMARY

The present invention provides in some embodiments addition units. In some embodiments, the addition units are high throughput, low latency units which overlap rounding with the addition of fractions. In some embodiments, the addition units conform to the ANSI/IEEE Standard 754-1985 described in "IEEE Standard for Binary Floating-Point Arithmetic" (American National Standards Institute, 1985).

In some embodiments a floating point addition unit includes two subunits each of which performs floating point addition. A multiplexer selects the result from one of the subunits. One subunit ("rounding subunit") performs rounding, and the other, "non-rounding" subunit does not. The result of the non-rounding subunit is selected only when a rounding operation is not needed. More particularly, the non-rounding subunit is selected only when the unrounded sum of the significands of the operands fits into the space allocated for the significand of the result.

In some embodiments, the non-rounding subunit is selected only when one of the following conditions (NR1), (NR2) is true (NR stands for "non-rounding"):

(NR1) The operation is an effective subtraction, and the operands have equal exponents.

(NR2) The operation is an effective subtraction, the magnitude ED of the difference between the exponents of the operands is 1, and result normalization is required.

The rounding subunit is selected in the remaining cases, that is, only when one of the following three conditions (R1), (R2), (R3) is true (R stands for "rounding"):

(R1) The operation is an effective addition.

(R2) The operation is an effective subtraction, the magnitude ED of the exponent difference is 1, and result normalization is not required.

(R3) The operation is an effective subtraction, and the exponent difference magnitude ED>1.

Because the rounding subunit does not have to provide a correct result when the non-rounding subunit is selected, the rounding subunit is simple and fast. One factor simplifying the rounding circuitry is that the rounding subunit is selected only when result normalization may require a shift by at most one digit. More particularly, normalization changes the position of digits in the result and brings a lost precision digit into the final result. Hence, the possibility of normalization makes it more difficult to determine in advance, before the significands are added, what operations will be required for rounding (in particular, whether the result must be incremented for rounding). Because the rounding subunit has to provide a correct result only when normalization requires a shift by at most one digit, it is easier to generate in advance signals needed both when normalization requires a shift and when normalization is not required. The rounding circuitry is therefore simplified.

The non-rounding subunit is faster and simpler because it does not perform rounding.

In some embodiments, the addition unit is balanced in the sense that both subunits take approximately the same amount of time to complete the addition operation. In the rounding subunit, the additional latency due to rounding is offset by fast normalization which requires a shift by at most one digit. In the non-rounding subunit, normalization is slower, but there is no delay associated with rounding. Thus, each addition operation takes about the same amount of time irrespective of whether the result of the operation is selected from the rounding or non-rounding subunit.

Other features and advantages of the invention are described below. The invention is defined by the appended claims.

DESCRIPTION OF PREFERRED EMBODIMENTS

Figure 1:
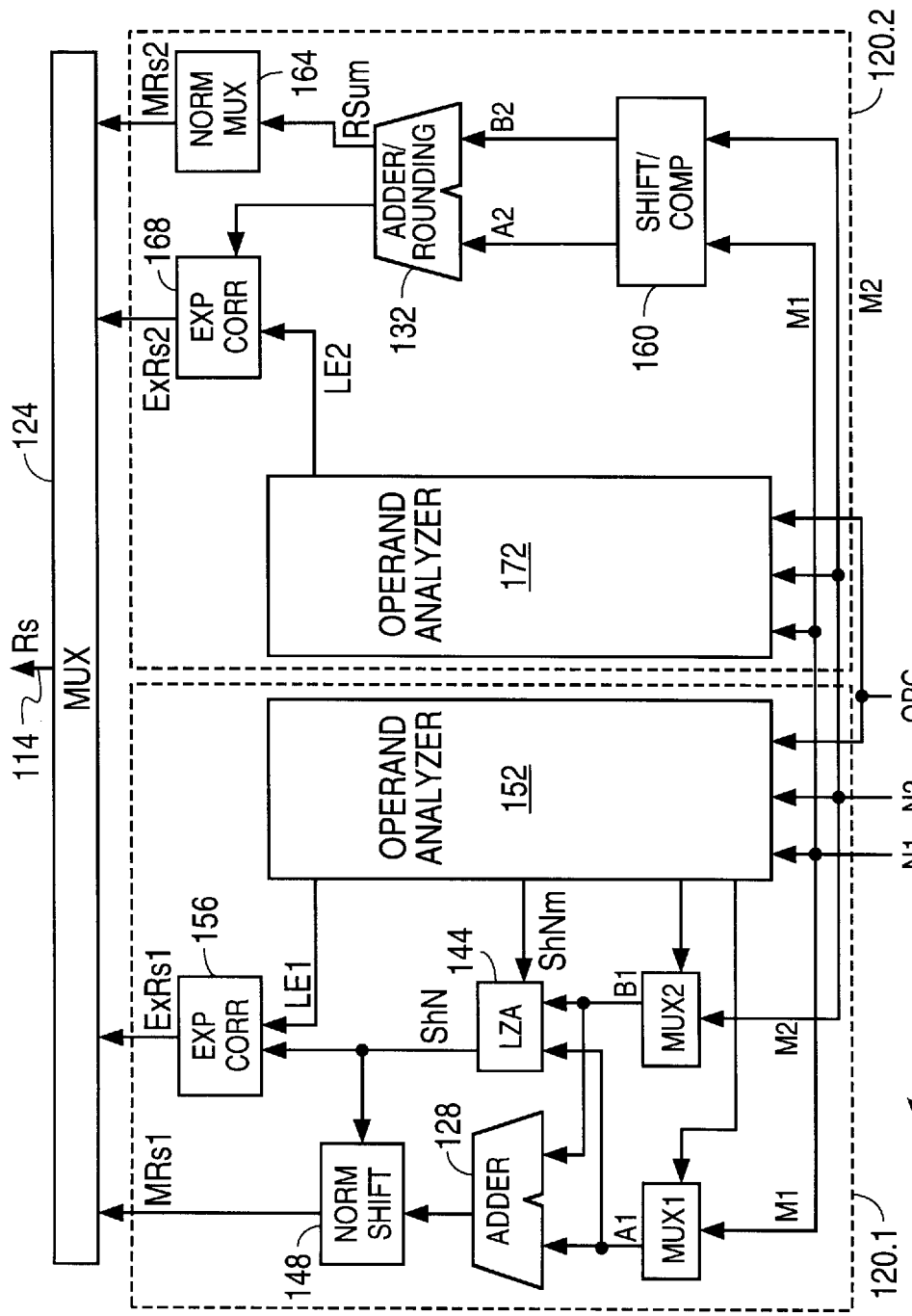
FIG. 1 is a block diagram of an addition unit according to the present invention.

FIG. 1 is a block diagram of high speed addition unit 110. In some embodiments, unit 110 is completely compatible with ANSI/IEEE Standard 754-1985 described in "IEEE Standard for Binary Floating-Point Arithmetic" (American National Standards Institute, 1985) hereby incorporated herein by reference. The operation of unit 110 will be described on the example of ANSI/IEEE Standard 754-1985.

Unit 110 includes non-rounding subunit 120.1 and rounding subunit 120.2. Each subunit 120 processes floating-point numbers N1, N2 in accordance with the operation code OPC. Code OPC specifies addition ("FADD"), subtraction ("FSUB"), or other operations as described below. Result multiplexer 124 selects the result from one of subunits 120 and provides the selected result Rs on output 114.

For the FADD and FSUB operations, the result of non-rounding subunit 120.1 is selected if, and only if, one of the following conditions (NR1), (NR2) is true:

(NR1) The operation to be performed on operands N1, N2 is an effective subtraction, and the operands N1, N2 have equal exponents. "Effective subtraction" means that either (a) the operands N1, N2 have the same sign and the operation involves a subtraction, or (b) the operands N1, N2 have the opposite signs and the operation involves an addition N1+N2 (or −(N1+N2)).

(NR2) The operation is an effective subtraction, the magnitude ED of the difference between the exponents of operands N1, N2 is 1, and result normalization is required. Normalization is assumed to be required if the output of significand adder 128 of subunit 120.1 has at least one leading non-significant digit.

In the remaining cases, multiplexer 124 selects the result generated by rounding subunit 120.2. More particularly, subunit 120.2 is selected when one of the following conditions (R1), (R2), (R3) is true:

(R1) The operation is an effective addition (i.e., not an effective subtraction).

(R2) The operation is an effective subtraction, the exponent difference magnitude ED=1, and normalization is not required.

(R3) The operation is an effective subtraction, and the exponent difference magnitude ED>1.

The cases in which the subunit 120.1 is selected do not require rounding. Accordingly, subunit 120.1 does not perform rounding. This makes subunit 120.1 faster and simpler.

In subunit 120.2, rounding is performed by significand adder 132 in parallel with significand addition. Because subunit 120.2 is not selected by multiplexer 124 in cases NR1 and NR2, this subunit is faster and simpler.

In subunit 120.1, multiplexers MUX1, MUX2 receive respective fractions M1, M2 of respective operands N1, N2, append the hidden bits to the fractions to obtain the operands' significands, and perform significand alignment and complementation. The significand alignment and complementation can be performed by fast and simple circuits such as multiplexers because subunit 120.1 is selected only when the significand alignment involves a shift by at most one digit. Significand complementation is performed to represent the subtrahend significand in one's complement form. The aligned significands, denoted A1 and B1 in FIG. 1, are provided by respective multiplexers MUX1, MUX2 to significand adder 128 and to leading zero anticipator (LZA) 144. LZA 144 generates shift amount ShN by which the output of adder 128 is to be shifted during normalization. LZA 144 receives the maximum possible shift amount ShNm from operand analyzer 152. ShN 5 ShNm. ShNm is selected so that after normalization the unbiased exponent of the result will be at least the minimal value Emin−1 where Emin is specified by ANSI/IEEE Standard 754-1985 and is equal to −1022 for the double format and to −126 for the single format. More particularly, $$ShNm = (LE1-1) \& ((\sim E1z)|(\sim E2z))$$

where LE1 is the maximum of Ex1, Ex2; Ex1 is the biased exponent of operand N1; Ex2 is the biased exponent of operand N2; E1z is a signal that Ex1=0; and E2z is a signal that Ex2=0. "&" is logical AND; "|" is logical OR; "~" is logical NOT. In particular, if both operands N1, N2 are denormalized, are zero, or one operand is denormalized and the other operand is zero, then Ex1=Ex2=0 and hence ShNm=LE1=0.

Because LZA 144 starts generating the shift amount before the significands are added by adder 128, subunit 120.1 is faster.

The outputs of adder 128 and LZA 144 are provided to normalization shifter 148. Shifter 148 provides normalized fraction MRs1 of the result to multiplexer 124.

Operand analyzer 152 provides to exponent correction circuit 156 the largest exponent LE1. Exponent correction circuit 156 subtracts from the largest exponent LE1 the normalization shift amount ShN and provides the subtraction result ExRs1 to multiplexer 124.

Some embodiments of subunit 120.1, including embodiments of adder 128 and LZA 144, are described in U.S. patent application Ser. No. 08/457,336 entitled "Computer Methods and Apparatus for Eliminating Leading Non-Significant Digits in Floating Point Computations" filed Jun. 1, 1995 by A. I. Grushin et al. and hereby incorporated herein by reference.

In subunit 120.2, shift/complement circuit 160 appends the hidden bits and performs significand alignment and complementation. Complementation is performed in the case of effective subtraction to represent the subtrahend significand in one's complement form. The subtrahend is selected to be the significand corresponding to the smallest exponent. Hence, the sum of the significands does not have to be complemented to obtain the significand of the result (in ANSI/IEEE Standard 754-1985, the fraction is in the sign-and-magnitude form).

Adder 132 performs unsigned-integer addition of the aligned significands A2, B2 provided by circuit 160, and rounds the sum of the significands. The rounded sum RSum is provided to normalization circuit 164. In subunit 120.2, normalization or overflow correction may require a shift by at most one digit. Hence, circuit 164 that performs normalization and overflow correction is a fast and simple circuit such as a multiplexer. Normalization multiplexer 164 provides the result fraction MRs2 to result multiplexer 124.

Exponent correction circuit 168 receives from operand analyzer 172 of subunit 120.2 the largest-exponent signal LE2=max(Ex1,Ex2). (In the description of unit 110, "exponent" means a biased exponent unless stated otherwise. In the embodiment being described, unit 110 operates on biased exponents. In some embodiments, unit 110 operates on unbiased exponents. In some embodiments, unit 110 works with floating point formats in which the exponent is represented without a bias.)

Circuit 168 corrects the exponent for normalization or overflow in accordance with a signal from adder 132. Circuit 168 provides the corrected exponent ExRs2 to multiplexer 124.

Figure 2:
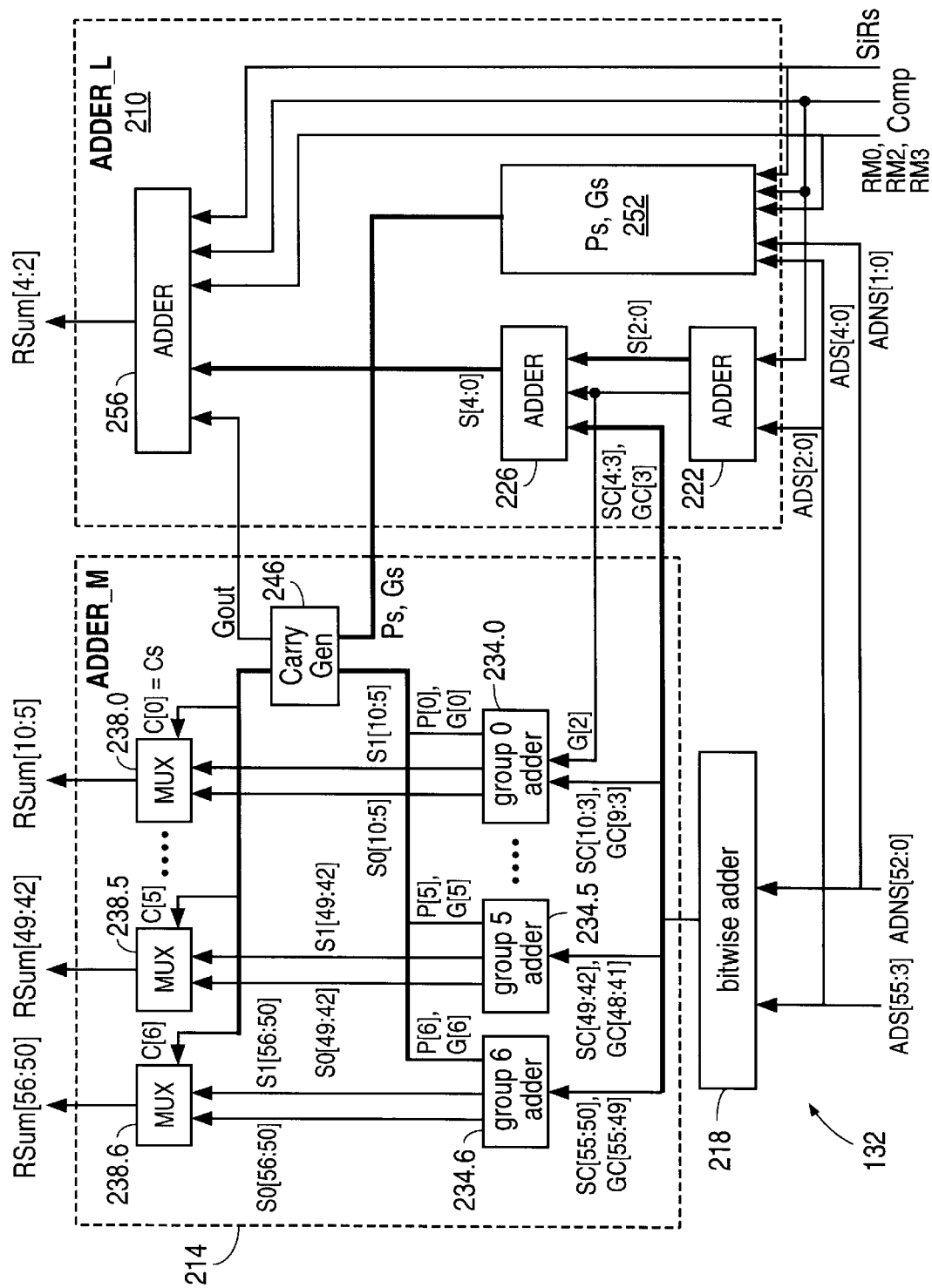
FIG. 2 is a block diagram of a rounding adder of significands which forms a part of the addition unit of FIG. 1.

FIG. 2 is a block diagram of significand adder 132. The aligned significands A2, B2 (FIG. 1) are shown in FIG. 2 as ADS (addend shifted), ADNS (addend not shifted). ADS is the significand corresponding to the smallest exponent. This significand has been shifted by circuit 160 if the exponents are unequal. In the case of effective subtraction, ADS has been complemented by circuit 160. ADNS is the other significand.

Operation of adder 132 will now be described for case when the operands N1, N2 and the result Rs are in the double format. As is well known, in ANSI/IEEE Standard 754-1985 a double-format number includes a one-bit sign, an 11-bit biased exponent, and a 52-bit fraction. A double-format significand includes 53 bits including the fraction and the hidden bit. In FIG. 2, ADNS has 53 bits [52:0]. Bit 52 is the most significant, and bit 0 is the least significant.

Figure 3:
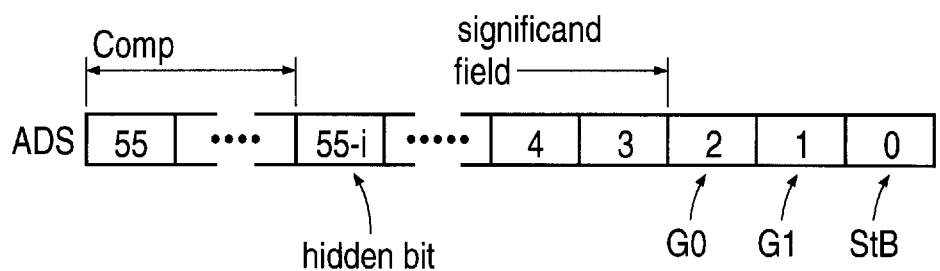
FIG. 3 diagrams the format of an aligned operand's significand an input of the adder of FIG. 2.

FIG. 3 illustrates the format of shifted significand ADS [55:0]. ADS is extended to 56 bits. Bit 55 is the most significant.

Significand ADS has been shifted right by i bits. i=|Ex1−Ex2|. Bits ADS [55-i:3] contain the bits of the original significand and are called the "significand field". Bit 55-i is the hidden bit. Bits 2 and 1, called respectively guard bit G0 and guard bit G1, receive the bits of the shifted significand. If the significand has been shifted by only one bit or no bits at all, the guard bits that do not receive a bit of the significand are filled with complementation signal Comp. Comp=1 if, and only if, the operation to be performed on operands N1, N2 is an effective subtraction. Since in an effective subtraction the complemented significand is the significand corresponding to the smaller exponent, if Comp=1, then the end-around carry is 1; if Comp=0, the end-around carry is 0.

ADS[0], denoted by StB, is the sticky bit. If the shift amount i is less than 3, sticky bit StB is set to Comp. If i≧3, then: (1) in the case of effective addition, StB=1 if, and only if, at least one "1" was shifted out of the significand field not counting the bits shifted into G0 and G1; (2) in the case of effective subtraction, StB=0 if, and only if, at least one "0" of the complemented significand was shifted out of the significand field not counting the bits shifted into G0 and G1.

Adder 132 generates signal RSum[56:2] containing the rounded significand of the result. Bit RSum[55] is aligned with bits ADS[55] and ADNS[52]. See the top and bottom of FIGS. 4 and 5 which illustrate operations performed by some embodiments of adder 132.

Figure 4:
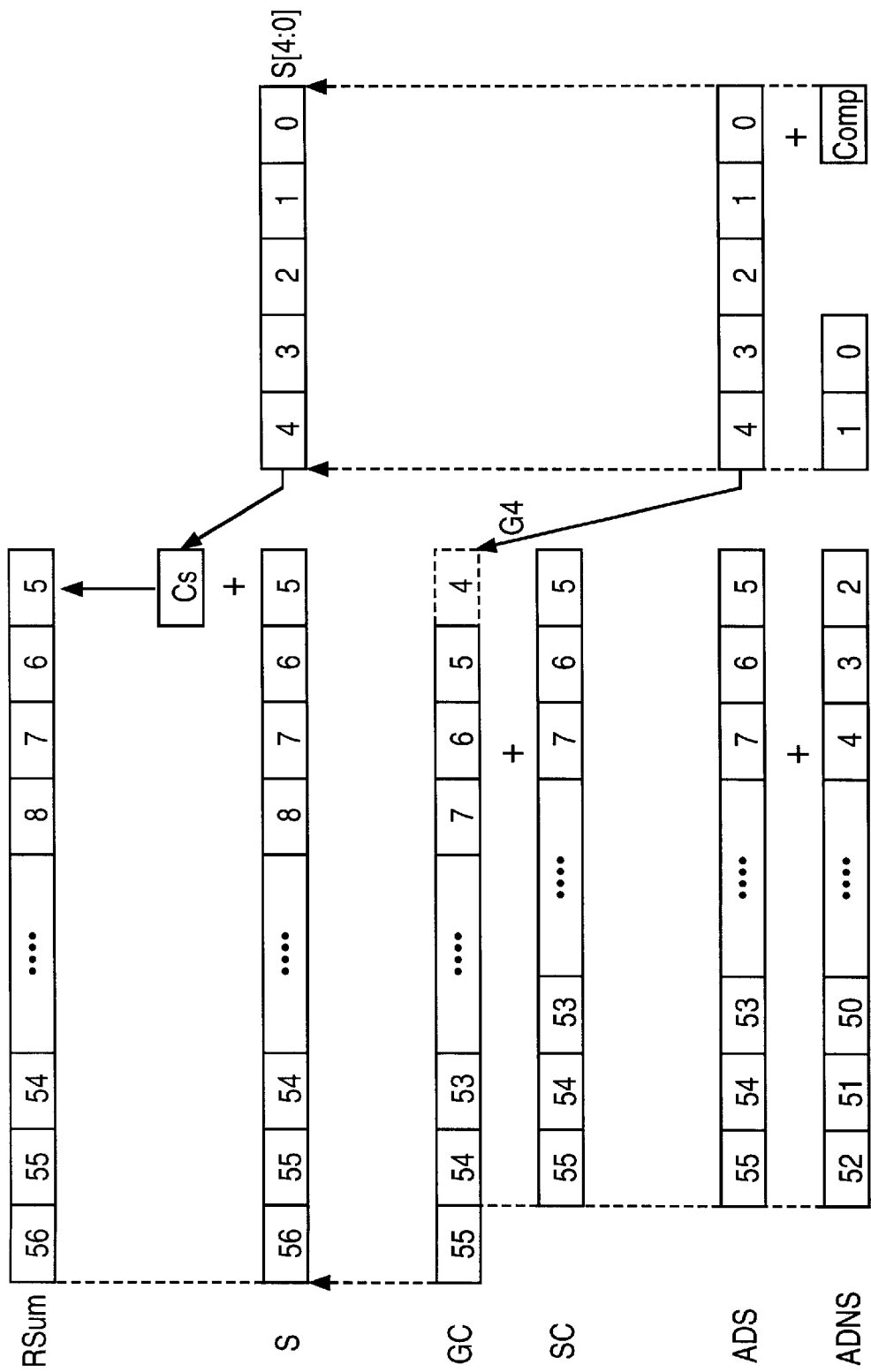
FIG. 4 is a flow chart of operations performed by the rounding adder in some embodiments of the unit of FIG. 1.
Figure 5:
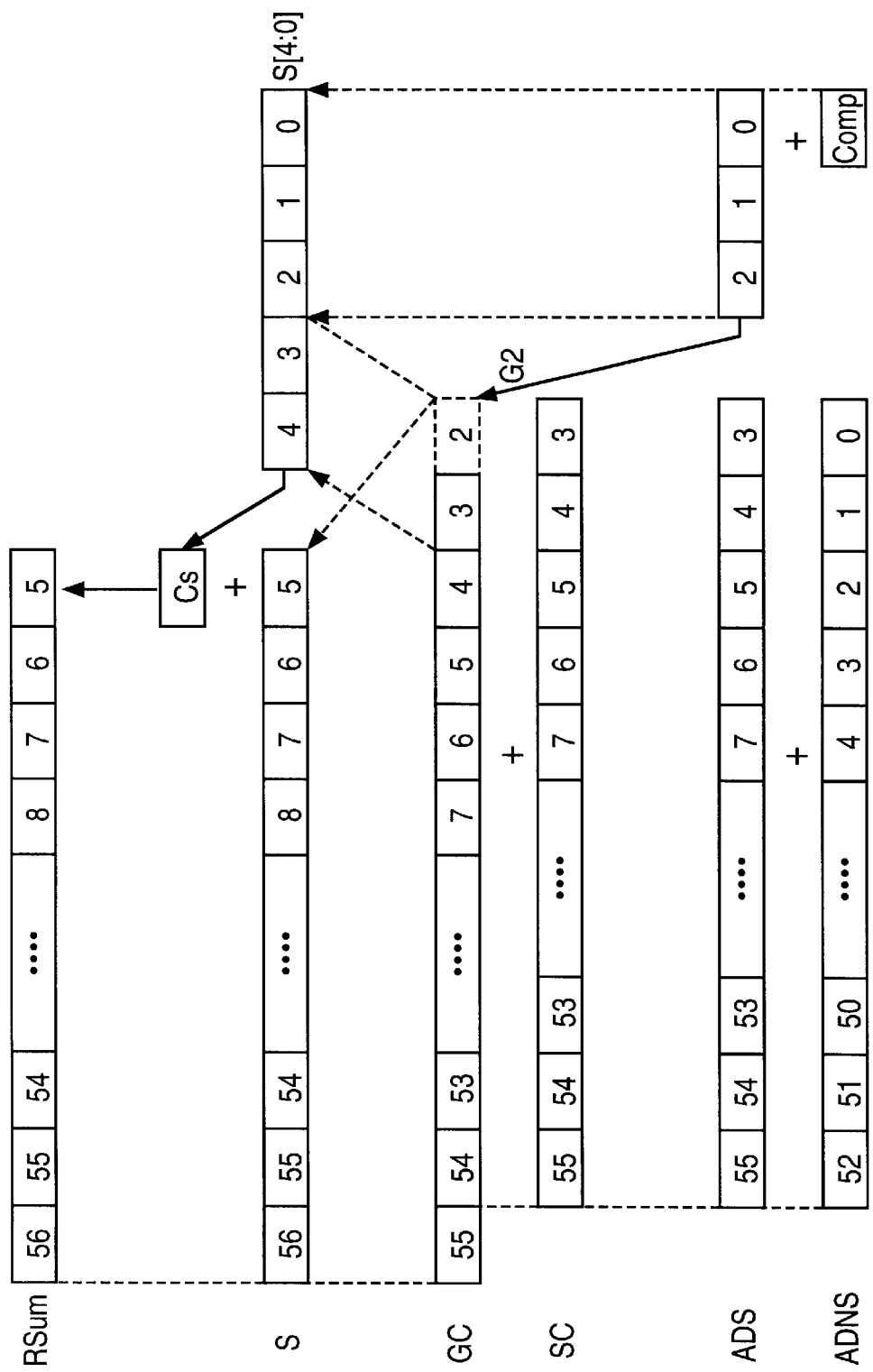
FIG. 5 is a flow chart of operations performed by the rounding adder in other embodiments of the unit of FIG. 1.

In FIGS. 4 and 5, the unrounded sum of ADS and ADNS is denoted by S[56:0]. Bit S[55] is aligned with ADS[55]. In some embodiments of adder 132, bits S[56:5] are not generated. These bits are illustrated in FIGS. 4 and 5 for clarity.

To round the sum S, a rounding signal RV (not shown) is added to: S[3] in the case when S is normalized and is generated without an overflow; S[2] if S is not normalized; S[4] if generation of the sum S causes an overflow. Addition of the rounding signal RV is performed by adder 210 (also shown in FIG. 2 as ADDER_L) which is part of adder 132. Adder 210 generates the sum S[4:0], adds the RV signal to S[4:0], and provides RSum[4:2]. At the same time, adder 214 (also shown as ADDER_M) and adder 218 generate RSum[56:5].

To reduce the delay due to rounding and thus make the rounding addition latency approach the latency of a non-rounding addition, adder 132 is constructed similarly to a conventional carry-select adder: adder 214 generates conditional sums and takes into account a carry from adder 210 to select the final result. Carry-select adders are described, for example, in A. R. Omondi, "Computer Arithmetic Systems: Algorithms, Architecture and Implementations" (1994), pages 76–89 hereby incorporated herein by reference.

However, in contrast with a carry logic in a conventional carry-select adder, adder 214 takes all of the following carries into account:

the carry generated in the addition of ADS[4:0] and the respective bits ADNS[1:0];

the end-around carry if this carry propagates through S[4:0]; and rounding carry Cs into bit S[5] which carry is generated when S is rounded.

The end-around carry is equal to Comp as explained above. In the embodiment of FIG. 4, adder 210 adds Comp to ADS[4:0] together with ADNS[1:0]. In the embodiment of FIG. 5, adder 210 adds Comp to ADS[2:0]. In both embodiments, Comp is aligned with ADS[0]. The addition of Comp is facilitated because no ADNS bit is added to ADS[0].

In the embodiment of FIG. 4, bitwise adder 218 adds ADNS[52:2] to ADS[55:5] and generates a bitwise sum vector SC[55:5] and a bitwise carry vector GC[55:5]. More particularly, for each i, a separate half adder in adder 218 generates:

$$SC[i]=ADS[i] \oplus ADNS[i-3], \quad (1)$$

$$GC[i]=ADS[i] \& ADNS[i-3] \quad (2)$$

"$\oplus$" means Exclusive OR. The carry vector GC is shifted left so that SC[55] is aligned with GC[54]. GC[4] is filled with the carry G4 from unrounded sum S[4:0]. G4 and S[4:0] are generated by adder 210.

Adder 214 forms conditional sums for SC[55:5] +GC [55:4]. Thus, the conditional sums take into account the carry generated from the addition of ADS[4:0] and ADNS [1:0] and the end-around carry.

In some embodiments, generation of carry G4 takes more time than generation of the vectors SC, GC. Therefore, adder 214 has to wait for G4. In the embodiment of FIG. 5, this wait is eliminated by having the adder 218 perform the bitwise addition on ADNS[52:0] and ADS[55:3]. In FIG. 2, the signal names are shown for the embodiment of FIG. 5. In particular, the inputs to adder 218 are shown in FIG. 2 as ADNS[52:0], ADS[55:3]. The outputs of adder 218 are the sum vector SC[55:3] and the carry vector GC[55:3]. Adder 218 includes a half adder for each bit position and uses the formulas (1), (2).

In parallel with generation of SC and GC, adder 222 within adder 210 adds ADS[2:0] to Comp and thus generates S[2:0] and the carry G2 from S[2:0]. In particular, $$G2=ADS[2] \& ADS[1] \& ADS[0] \& COMP \quad (3)$$

Signal G2 is placed in GC[2]. Signals SC[4:3], GC[3], G2, S[2:0] are provided to adder 226 which is part of adder 210. Adder 226 generates the unrounded sum S[4:0] using methods known in the art.

Meanwhile, adder 214 adds SC[55:3] to GC[55:2] (GC is shifted left by 1 bit) and generates conditional sum bits [56:5] for unrounded sum S as explained more fully below. In the description of adder 132, the bit numbers are those of SC unless stated otherwise. For example, conditional sum bit [5] and the bits S[5] and RSum[5] are aligned with SC[5] rather than GC[5].

Conditional sum bits [4:3] are not generated by adder 214.

Since GC[2]=G2, the conditional sums take into account the end-around carry Comp and the carry from the addition of ADS[4:0] and ADNS[1:0].

To reduce the rounding latency, adder 214 is made similar to a conventional carry-select adder. In adder 214, the bit positions are divided into groups 0 through 6. For each group j (j=0, 1, . . . 6), a corresponding group adder 234.j adds the group's bits and generates: (1) a conditional sum S0 assuming that the carry C[j] into the group j is 0; and (2) a conditional sum S1 assuming that C[j] =1. In particular:

adder 234.0 adds {GC[9:3], G2} and SC[10:3] and generates S0[10:5], S1[10:5] (curly brackets {} denote concatenation);

adder 234.1 adds GC[17:10], SC[18:11] and generates S0[18:11], S1[18:11];

adder 234.2 adds GC[25:18], SC[26:19] and generates S0[26:19], S1[26:19];

adder 234.3 adds GC[32:26], SC[33:27] and generates S0[33:27], S1[33:27];

adder 234.4 adds GC[40:33], SC[41:34] and generates S0[41:34], S1[41:34];

adder 234.5 adds GC[48:41], SC[49:42] and generates S0[49:42], S1[49:42];

adder 234.6 adds GC[55:49], SC[55:50] and generates S0[56:50], S1[56:50], where S0[56], S1[56] are carries out of the respective sums.

The conditional sums from each adder 234.j are provided to the respective multiplexer 238.j. The select input of each multiplexer 238.j receives the carry signal C[j] generated by carry generator circuit 246 described below. Unlike in a conventional carry-select adder, carries C[j] take rounding into account. Each multiplexer 238.j selects one conditional sum and provides it as respective bits of rounded significand RSum.

To facilitate generation of group carries C[j], each group adder 234.j for j<6 generates: (1) carry generate signal G[j] which is a signal that group j generates a carry; and (2) carry propagate signal P[j] which is a signal that a carry into group j propagates through the group. P[j] is a signal that in each bit position in the group, one or both addend bits are equal to 1.

Group adder 234.6 generates signals G[6], P[6] described below. These signals are generated for rounding and are not carry generate or carry propagate signals as for the remaining groups j<6.

The group carries C[j] are generated using the following principle: if c[i] is a carry into bit i, then $$c[k] = g[k-1,m] | p[k-1,m]\ \&\ c[m] \qquad (4)$$

where g[k-1,m], p[k-1,m] are respectively carry generate and carry propagate signals for the group of bits m through k-1 (m≦k-1). Using the formula (4), group carries C[1] through C[6] are generated from C[0], P[j], G[j] by circuits suitable for a non-rounding adder. However, C[0] =Cs and thus takes rounding into account. Hence, carries C[1] through C[6] take rounding into account.

Figure 6:
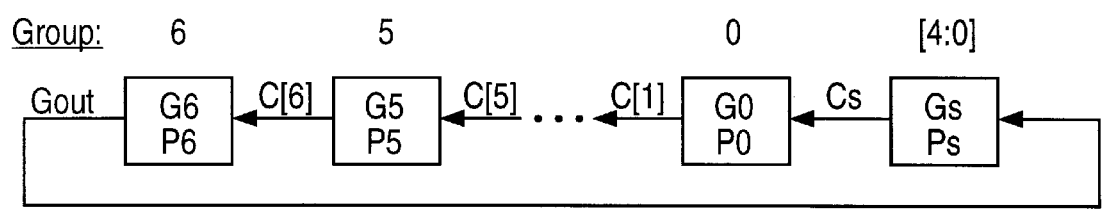
FIG. 6 is diagram illustrating signals in a rounding operation in the adder of FIG. 2.

In order to make the addition latency closer to the latency of non-rounding addition, and to make the design of adder 132 more regular and closer to the design of a non-rounding adder, the rounding carry C[0]=Cs is generated using a formula similar to formula (4):

$$C[0] = GS | PS\ \&\ Gout \qquad (5)$$

where signals Gs, Ps, Gout are described below. If adder 132 were non-rounding, formula (5) would hold true if Gs were the carry generate signal for bits [4:0], Ps were the carry propagate signal for bits [4:0], and Gout were the carry into bit 0, that is, the end-around carry. See FIG. 6. If adder 132 were non-rounding, adder 210 would be a group adder for bit group [4:0]. In the rounding adder 132 of FIG. 2, signals Gs, Ps, Gout have a different meaning such that the carry C[0] takes rounding into account.

More particularly, Gout=1 if, and only if, an overflow occurs in an effective addition or no normalization is required in an effective subtraction. In the description of adder 132, unless stated otherwise, the term "overflow" denotes an overflow in the unrounded result S rather than an overflow caused by rounding; similarly, normalization is said to be required if the unrounded sum S is not normalized, even if rounding would make the sum normalized.

Thus Gout is the carry into bit 56 in an effective addition or the carry into bit 55 in an effective subtraction:

$$Gout = (\sim COMP)\ \&\ c[56] | Comp\ \&\ c[55].$$

The values of c[56] and c[55] assume the rounding carry Cs=0.

Ps is the value of the rounding carry Cs in the case of an effective addition with an overflow or an effective subtraction with normalization not required, that is, in the case Gout=1. In this case, Gs=0. Gs is the value of the rounding carry in an effective addition without an overflow or in an effective subtraction with normalization required (Gout=0).

Gout is generated in carry generator 246 by a circuitry suitable for a non-rounding adder:

$$\begin{aligned}Gout = G[6] & | \\ G[5]\ \&\ P[6] & | \\ G[4]\ \&\ P[5]\ \&\ P[6] & | \\ G[3]\ \&\ P[4]\ \&\ P[5]\ \&\ P[6] & | \\ G[2]\ \&\ P[3]\ \&\ P[4]\ \&\ P[5]\ \&\ P[6] & | \\ G[1]\ \&\ P[2]\ \&\ P[3]\ \&\ P[4]\ \&\ P[5]\ \&\ P[6] & | \\ G[0]\ \&\ P[1]\ \&\ P[2]\ \&\ P[3]\ \&\ P[4]\ \&\ P[5]\ \&\ P[6] & \end{aligned} \qquad (6)$$

This formula would be suitable for a non-rounding adder similar to adder 132 if G[6], P[6] were respectively carry generate and carry propagate signals for group 6. In rounding adder 132, $$G[6] = Comp\ \&\ (H[55] \oplus g[54,50]) | \sim Comp\ \&\ (H[56] | g[55] | p[55]\ \&\ g[54,50]),\ P[6] = p[54,50]\ \&\ (p[55] | Comp), \qquad (7)$$

where H[55] is a partial sum for bit 55 (i.e. H[55] =SC[55] ⊕GC[54]),

H[56]=GC[55] is a partial sum for bit 56, g[55], p[55] are respectively carry generate and carry propagate signals for bit 55.

Signals Gs, Ps are generated by circuit 252. In some embodiments, they are generated as shown in Appendix 1. The input signals in FIG. 2 are shown for different embodiments described below. In the embodiment of Appendix 1, the inputs to circuit 252 include: (1) bits S[4:0] provided by adder 226; (2) Comp; (3) signals RM0, RM2, RM3 which specify the rounding mode. RM0 is "round to nearest", RM2 is "round toward+∞", and RM3 is "round toward −∞". When RM0, RM2, RM3 are deasserted, the rounding mode is "round toward zero". The four rounding modes are defined in ANSI/IEEE Standard 754-1985. In Appendix 1, the rounding mode is indicated by MOD. MOD is 0 for "round to nearest", 1 for "round toward zero", 2 for "round toward +∞", and 3 for "round toward −∞".

Another input to circuit 252 is the sign SiRs of the result Rs. SiRs is generated by operand analyzer 172 and is equal to the sign of the operand with the largest exponent. SiRs=0 if the result is positive, and SiRs=1 if the result is negative, as defined in ANSI/IEEE Standard 754-1985.

The table of Appendix 1 can be constructed by examining truth tables each of which expresses Gs, Ps as a function of S[4:0] for given values of Comp, MOD, and SiRs. One such table is shown in Appendix 2 for Comp=0, MOD=0. SiRs is "don't care" since for the "round to nearest" mode (MOD=0) the result sign is a "don't care" for rounding.

Alternatively, the following reasoning can be used to arrive at the table of Appendix 1. For the round to nearest mode, in the case of an effective addition without an overflow (Gout=0 and Cs=Gs), the least significant bit of the significand of the final result is bit 3 of RSum (assuming that rounding does not cause an overflow; of note, the formulas for Gs, Ps are the same whether or not rounding causes an overflow in an effective addition or normalizes the unrounded sum S in an effective subtraction.) Therefore, if rounding requires incrementing, 1 will be added to S[3]. Cs=1 if and only if 1 is added to S[3] and the addition carry propagates through S[4:3], that is, if and only if 1 is added and S[4] =S[3]=1. Further, if S[3]=1, then 1 is added for rounding if and only if S[2]=1. Hence, Gs=S[4] & S[3] & S[2].

Similar reasoning shows that in the case of overflow (in this case Comp=0 since an overflow can occur only in effective addition, Gout=1, and the least significant bit of the significand of the final result is RSum[4]), Cs=Ps=S[4] & S[3]. In the case of normalization (Comp=1, Gout=0, and the least significant bit of the result significand is RSum[2]), Cs=Gs=S[4] & S[3] & S[2] & S[1].

The remaining formulas for Gs, Ps can be obtained using similar analysis. Since the subunit 120.2 is selected only when normalization may require a shift by at most one digit, the analysis is simplified and so is the circuit 252.

In the embodiment of FIG. 2, to speed up the addition, the circuit 252 starts generating Gs, Ps before rounded sum bits S[4:0] are generated. In this embodiment, the inputs of circuit 252 are: ADS[4:0], ADNS[1:0], Comp, SiRs, RM0, RM2, RM3. Circuit 252 uses the following logic:

Gs=Comp & Gs_s|~Comp & Gs_a,

Ps=Comp & Ps_s|~Comp & Ps_a, where

Gs_a = SC[4] & SC[3] &
   ((R1 | R2) & ADS[2] | (R2 & (ADS[1] | ADS[0] )),
Gs_s = SC[4] & SC[3] &
   [ADS[2] ⊕ [(ADS[1] & ADS[0] )) &
   ((R1 & (ADS[1] ⊕ ADS[0] ))
   (R2 & (~ADS[1] | ~ADS[0] ))),
Ps_a = ((R1 | R2) & SC[4] & SC[3] ) |
   (R2 & (SC[4] ⊕GC[3] ) & (A[S[2] | ADS[1] | ADS[0] )),
Ps_s = (R1&SC[4] &SC[3] & (ADS[2] ⊕ (ADS[1] &ADS[0] ))) |
   (R2 & SC[4] & SC[3] & (~ADS[2] | ~ADS[1] | ~ADS[0] )), where:
R1=RM0;
R2=RM2 & ~SiRs|RM3 & SiRs;
"⊕" is an exclusive OR.

To generate group carries C[j], carry generator circuit 246 uses circuitry suitable for a non-rounding carry-select adder with 8 groups of bits where bits [4:0] form a separate group and the end-around carry is ignored:

C[i]=G[i-1]|... Gs & P[0] & ... & P[i-1]|Gout & Ps & P[0] & ... & P[i-1]

For example:

C[5] = G[4] |
   G[3] & P[4] |
   G[2] & P[3] & P[4] |
   G[1] & P[2] & P[3] & P[4] |
   G[0] & P[1] & P[2] & P[3] & P[4] |
   Gs & P[0] & P[1] & P[2] & P[3] & P[4] |
   Gout & Ps & P[0] & P[1] & P[2] & P[3] & P[4].

Hence, compared to the non-rounding adder, the circuitry for C[i] includes the additional term:

Gs & P[0] & ... & P[i-2] & P[i-1].

Further, the Gout term in the formula for C[i] is augmented by the factor Ps and is:

Gout & Ps & P[0] & ... & P[i-2] & P[i-1].

To speed up the addition, the generation of group carries C[j] is started before the signal Gout is available. To generate the group carries, carry generator 246 does not use the signal Gout but instead uses the Gout components shown in formula (6) above.

In some embodiments, generation of G[6], P[6] takes no more logic levels than generation of the other group carry generate and propagate signals G[j], P[j]. See formulas (7) above. Therefore, compared to a non-rounding adder, the number of logic levels in some embodiments of adder 132 is increased by only one level consisting of the following circuitry in adders 222, 218: 2-input AND gates generating GC (see formula (2)), 2-input exclusive OR gates generating SC (formula (1)), and a 4-input AND gate generating G2 (formula (3)).

For single format operands, operation of adder 132 is similar but the signals Ps, Gs are generated based on bits S[33–29]. Each single-format operand (32-bit long) is represented at the input of unit 110 in a 64-bit field. The single-format operand's exponent is aligned according to the least significant bit of a double-format exponent, and the single-format operand's fraction is aligned according to the most significant bit of a double-format fraction.

Adder 256 in adder 210 adds the rounding signal RV to the sum bits S[4:2] and generates the rounded sum RSum [4:2]. The bit to which RV is added is determined from Comp and Gout as follows. In the case of no overflow and no normalization (Comp=Gout=0 or 1), RV is added to S[3]. In the case of overflow (Comp=0, Gout=1), RV is added to S[4]. In the case of normalization, (Comp=1, Gout=0 ), RV is added to S[2]. In determining the bit to which RV is added, we ignore the possibility that rounding may cause overflow or normalization, because the same circuitry works correctly whether or not rounding causes overflow or normalization.

Appendix 3 illustrates the adder 256 circuitry that generates the rounding signal RV. In Appendix 3, the rounding signal RV is shown as: (1) Gr3 if RV is added to S[4]; (2) Gr2 if RV is added to S[3]; and (3) Gr1 if RV is added to S[2]. The inputs to this circuitry are Comp, RM0, RM2, RM3, Gout, SiRs, and S[3:0]. In Appendix 3 , the rounding mode signals RM0, RM2, RM3 are coded into the variable MOD similarly to Appendix 1.

Adder 256 is fast because it corrects at most three bits [4:2] and because, therefore, the addition of the rounding bit RV involves carry propagation through at most two bits. Adders 222, 226 are fast because they operate on numbers having only five bits [4:0]. Adder 210 operates in parallel with adders 214, 218. Because rounding overlaps with addition, and because normalization or overflow correction requires a shift by at most one bit, subunit 120.2 is fast and the subunit circuitry is simplified. In subunit 120.2, if the operation is effective subtraction, the significand corresponding to the smallest exponent is complemented. Hence, the significand of the result does not have to be complemented, simplifying the subunit 120.2 and increasing the subunit speed.

Figure 7A:
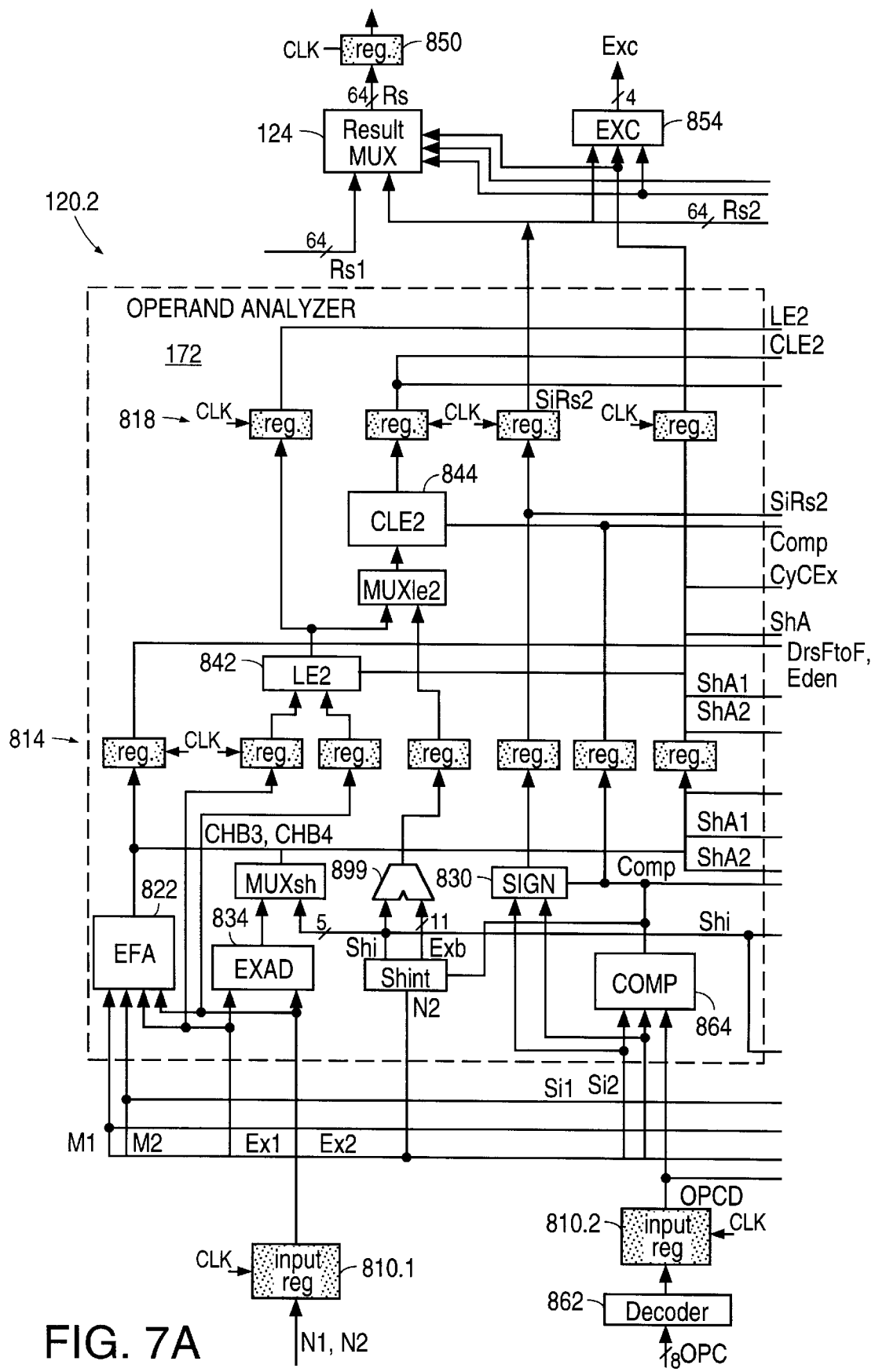
FIG. 7 consisting of FIGS. 7A–7B is a detailed block diagram of the rounding subunit of the unit of FIG. 1.
Figure 7B:
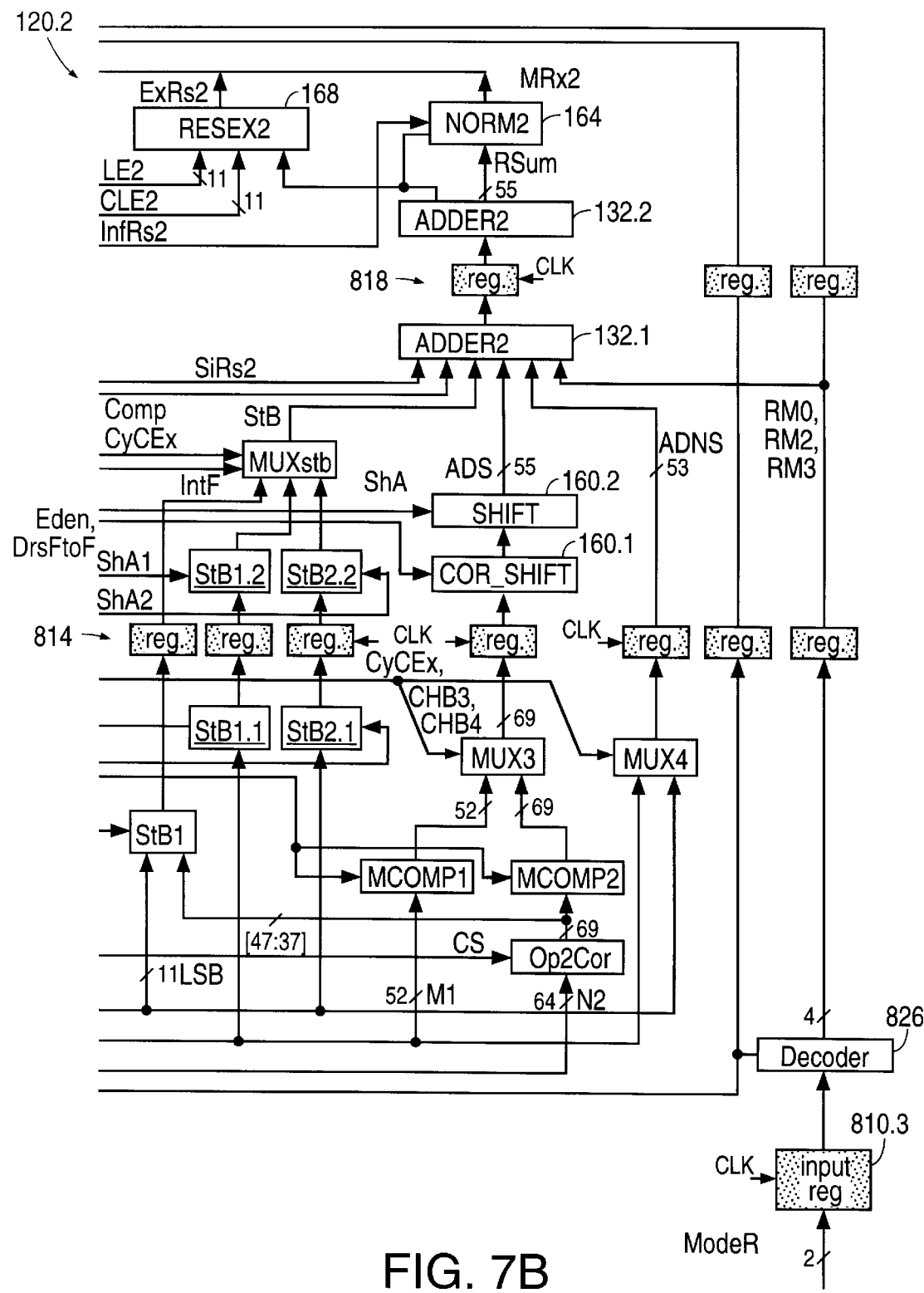
Figure 8A:
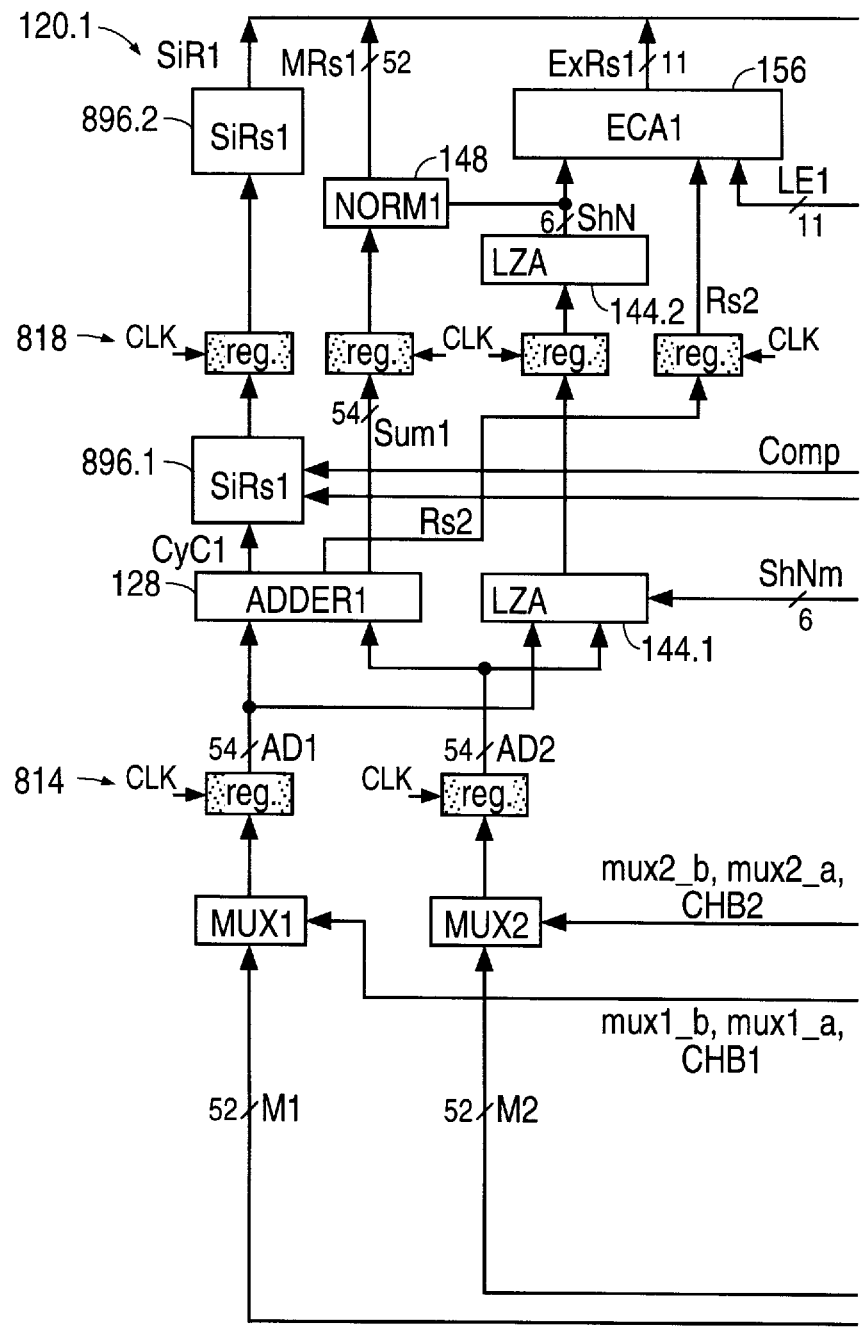
FIG. 8 consisting of FIGS. 8A–8B is a detailed block diagram of the non-rounding subunit of the unit of FIG. 1.
Figure 8B:
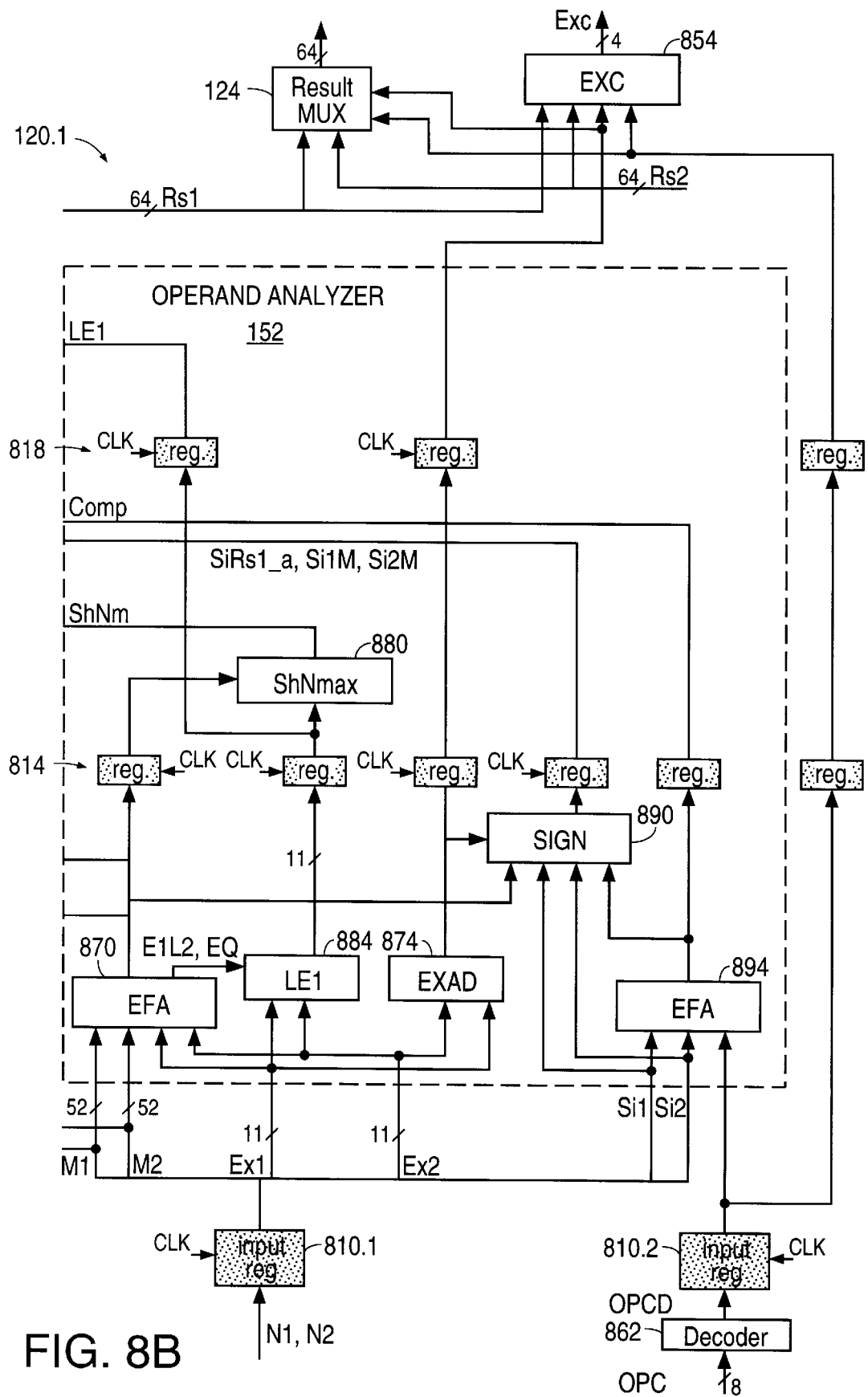

FIG. 7 consisting of FIGS. 7A, 7B is a block diagram of one embodiment of subunit 120.2. FIG. 8 consisting of FIGS. 8A, 8B is a block diagram of one embodiment of subunit 120.1. Subunits 120 of FIGS. 7, 8 are pipelined. The first stage of the pipeline is between register row 810 (registers 810.1 through 810.3) and register row 814; the second stage is between registers 814 and register row 818; and the third stage is between registers 818 and output register 850. Instruction execution time is 3 clock cycles, one cycle for each stage. One instruction can be started each cycle.

Input registers 810.1, 810.2 in FIG. 7A and input registers 810.1, 810.2 in FIG. 8B are the same registers in some embodiments.

In subunit 120.2, fractions M1, M2 are complemented by respective circuits MCOMP1, MCOMP2 (FIG. 7B) if Comp=1, and are provided to multiplexer MUX3. Circuits MCOMP1, MCOMP2 receive Comp from COMP circuit 864 (FIG. 7A). Multiplexer MUX3 selects the fraction corresponding to the smallest exponent and appends the hidden bit. The hidden bits are assumed to be 1, but are cleared respectively by signal CHB3 for operand N1 and by signal CHB4 for operand N2 if the respective operand N1 or N2 is denormalized or zero. Signals CHB3, CHB4 are generated by exponent and fraction analyzer (EFA) 822 (FIG. 7A) of operand analyzer 172.

The significand provided by multiplexer MUX3 is shifted by COR_SHIFT circuit 160.1 and SHIFT circuit 160.2. More particularly, SHIFT circuit 160.2 shifts the significand right by the amount ShA=|Ex1−Ex2| provided by exponent adder (EXAD) 834 (FIG. 7A). COR_SHIFT circuit 160.1 pre-shifts the significand left by 1 digit if signal Eden indicates that one operand is denormalized and the other operand is normalized. Eden is generated by EFA 822 for the instructions of addition and subtraction. As described below, unit 110 also executes floating point double-to-single conversion instructions FdTOs. For these instructions, EFA 822 generates signal DrsFtoF. If DrsFtoF is asserted in FdTOs, COR_SHIFT circuit 160.1 shifts the significand right by 1 digit.

The output of SHIFT circuit 160.2 is ADS[55:1]. This output is provided to adder 132. Adder 132 is divided into two parts 132.1, 132.2 by pipeline registers 818.

Multiplexer MUX4 selects the fraction corresponding to the largest exponent, appends the hidden bit, and passes the resulting significand as ADNS[52:0] to adder 132.

Adder 132 receives Comp from COMP circuit 864.

Multiplexers MUX3, MUX4 are controlled by the end-around carry CyCEx generated in the subtraction Ex1−Ex2 performed by exponent adder 834. Circuits 160.1, 160.2, MUX3, MUX4, MCOMP1, MCOMP2 are part of shift/complement circuit 160 (FIG. 1).

Circuit StB1 divided into circuits StB1.1, StB1.2 by registers 814 generates the sticky bit under the assumption that the first operand N1 has the smallest exponent. Circuit StB2 divided into circuits StB2.1, StB2.2 by registers 814 generates the sticky bit under the assumption that the second operand N2 has the smallest exponent. To generate the sticky bits, circuits StB1, StB2 receive from exponent adder 834 respective shift amounts ShA1, ShA2 by which the significand of the respective operand N1 or N2 is to be shifted if the significand corresponds to the smallest exponent. Circuit StBi generates the sticky bit for use in integer-to-floating conversion operations. Multiplexer MuxStB selects one of the sticky bits generated by circuits StB1, StB2, StBi. Multiplexer MuxStB is controlled by end-around carry CyCEx and by a signal IntF. IntF=1 means an integer-to-floating conversion operation. If IntF=0, multiplexer MuxStB selects the output of circuit StB1 or StB2 depending on CyCEx. If IntF=1, multiplexer MuxStB selects the output of circuit StBi. Multiplexer MuxStB provides the selected bit as ADS[0] to adder 132.

Decoder 826 (FIG. 7B) receives two-bit rounding mode signal ModeR and decoded operation code OPCD generated from OPC by decoder 862 (FIG. 7A). Decoder 826 decodes the two-bit rounding mode and generates the signals RM0, RM2, RM3 for adder 132 and result multiplexer 124. Unless OPCD specifies floating-to-integer conversion, in case of overflow in the result Rs (this overflow may or may not be caused by rounding), the multiplexer 124 generates infinity or the largest finite number depending on the rounding mode, as specified by ANSI/IEEE Standard 754-1985.

Adder 132 provides bits RSum[56:2] to multiplexer 164. Multiplexer 164 shifts the significand RSum of the result if needed for normalization or overflow correction as described above in connection with FIG. 1.

LE2 circuit 842 (FIG. 7A) selects the largest exponent LE2 from the exponents Ex1, Ex2 using the end-around carry CyCEx. If CyCEx=1, LE2 is set to Ex1. If CyCEx=0, LE2=Ex2.

CLE2 circuit 844 generates in advance the exponent CLE2 corrected for possible overflow or normalization:

CLE2=LE2+1 if Comp=0 (effective addition);

CLE2=LE2−1 if Comp=1 (effective subtraction).

Exponent correction circuit 168 is a multiplexer selecting LE2 in case of no overflow and no normalization and selecting CLE2 in case of overflow or normalization (no matter whether overflow or normalization have been caused by rounding). Circuit 168 is thus fast and simple. Circuit 168 receives from adder 132 signals indicating whether an overflow has occurred or normalization is required, whether or not such overflow or normalization were caused by rounding. Multiplexer 164 and exponent correction circuit 168 provide the result exponent ExRs2 and the result fraction MRs2 to result multiplexer 124.

In the case of effective addition, when both operands N1, N2 are denormalized, or one of the operands is denormalized and the other one is 0, LE2 is set to 1 and CLE2 is set to LE2−1=0. If the operation is an effective addition, the result may be normalized even if both operands are denormalized (provided there is a carry into RSum[56]). In this case, the result exponent is equal to 1, and exponent correction circuit 168 selects LE2.

In the case of an effective addition of two denormalized numbers or of a denormalized number and zero, normalizing multiplexer 164 does not perform a normalizing shift.

If CLE2=Emax+1, wherein Emax=2046 is the maximum possible biased exponent value for double format normalized numbers in the ANSI/IEEE Standard 754-1985, and if an overflow occurs, signal InfRs2 generated by CLE2 circuit 844 causes the normalizing multiplexer 164 to clear the result fraction MRs2 and to provide an OVERFLOW signal to exception circuit 854.

SIGN circuit 830 in operand analyzer 172 generates the result sign SiRs2 (shown as SiRs in FIG. 2 and Appendices 1 and 3) from the signs Si1, Si2 of respective operands N1, N2. Sign SiRs2 is the sign of the operand with the largest exponent. Sign SiRs2 can be generated before the significand addition because in the case of an effective subtraction the unit 120.2 is selected only if the operand exponents are unequal. Sign SiRs2 is delivered to adder 132 and multiplexer 124.

In operand analyzer 172, exponent adder 834 generates the following signals for result multiplexer 124: EDEQ1 which means that the exponent difference magnitude ED=1; EDLE1 which means ED≦1; and EDGT1 which means ED>1.

The output of multiplexer 124 is written to register 850.

The inputs of exception circuit 854 (FIGS. 7A, 8B) include: (1) decoded operation code OPCD from decoder 862; (2) the exponent difference magnitude ED from exponent adders (EXAD) 834, 874 of respective subunits 120.2, 120.1; and (3) floating point operation results Rs1, Rs2 from subunits 120.1, 120.2. Exception circuit 854 generates a four-bit exception signal Exc, with one bit for each of the four exceptions "Invalid Operation", "Overflow", "Underflow", "Inexact". Signal Exc conforms to ANSI/IEEE Standard 754-1985.

In subunit 120.1, multiplexers MUX1, MUX2 (FIG. 8A) append the hidden bits and perform the significand alignment and complementation as described above in connection with FIG. 1. The signals CHB1, CHB2 similar to respective signals CHB3, CHB4 are provided to multiplexers MUX1, MUX2 by exponent and fraction analyzer (EFA) 870 (FIG. 8B) in operand analyzer 152. If the exponents Ex1, Ex2 are not equal, the significand of the operand N1 or N2 having the smallest exponent is shifted right by one digit and complemented. If the exponents are equal, the significand of operand N2 is complemented. Multiplexer MUX1 is controlled by signals mux1_b, mux1_a generated by EFA 870. Multiplexer MUX2 is controlled by signals mux2_b, mux2_a generated by EFA 870. At the time multiplexers MUX1, MUX2 align and complement the significands, the accurate exponent difference has not yet been generated by exponent adder (EXAD) 874. To control the multiplexers MUX1 and MUX2, EFA 870 estimates the exponent difference from the two least significant bits of each exponent as described, for example, in B. J. Benschneider et al., "A Pipelined 50 MHz CMOS 64-Bit Floating-Point Arithmetic Processor", IEEE Journal of Solid-State Circuits, Vol. 24, No. 5 (October 1989), 1317, at page 1320. The entire Benschneider et al. article is hereby incorporated herein by reference. If it is later determined that the exponent difference magnitude ED is greater than one, multiplexer 124 selects the result from subunit 120.2.

Adder 128 adds the significands received from multiplexers MUX1, MUX2. LZA 144 determines the shift amount ShN by which the sum of the significands is to be shifted for normalization. LZA 144 is divided into two parts 144.1, 144.2 by pipeline registers 818.

Normalization shifter 148 normalizes the output of adder 128 in accordance with the output of LZA 144 and provides the normalized fraction MRs1 to multiplexer 124. See the description above in connection with FIG. 1, and see the aforementioned U.S. patent application Ser. No. 08/457,336.

If the sum generated by adder 128 is 0, adder 128 asserts the signal Rsz in response to which the exponent correction circuit 156 sets the result exponent ExRs1 to 0.

LZA 144 receives the maximum possible shift amount ShNm from circuit 880 of operand analyzer 152. If ShN>ShNm, the result of the floating point operation is denormalized.

Circuit 880 receives the largest-exponent signal LE1 from circuit 884. Circuit 884 generates the largest exponent from the exponents Ex1, Ex2 using the following signals provided by EFA 870: (1) signal E1L2 which means Ex1<Ex2; and (2) signal EQ which means the two exponents are equal. If the operands N1, N2 are denormalized or one operand is denormalized and the other operand is zero, ShNm is set equal to LE1 (which is zero).

Signals mux1_b, mux1_a, mux2_b, mux2_a are derived from E1L2, EQ.

EXAD 874 provides the exponent difference magnitude ED to exception circuit 854 and to SIGN circuit 890. Circuit 890 receives the signs Si1, Si2 of respective operands N1, N2 and also receives the Comp signal from COMP circuit 894. SIGN circuit 890 generates signals SiRs1_a, Si1M, Si2M to sign circuit 896 divided into two parts 896.1, 896.2 by registers 818. Signals Si1M, Si2M provide information on the signs of operands N1, N2. Signal SiRs1_a is the result sign generated assuming the exponents Ex1, Ex2 are unequal. Circuit 896 receives the end-around carry CyC1 from adder 128 and provides the result sign SiRs1 to multiplexer 124.

Besides FADD, FSUB, unit 110 also executes the following instructions if directed so by operation code OPC.

FsTOi—conversion of single format floating point to single format (32 bits) integer;
 FsTOx—single floating point to double (64 bits) integer;
 FdTOi—double floating point to single integer;
 FdTOx—double floating point to double integer.
 Instruction execution time is 3 cycles.

These instructions are implemented by adding the to-be-converted floating point operand N2 with a floating point operand N1 which has a zero sign, a zero fraction, a zero hidden bit, and an exponent Ex1 defined as follows. For FsTOi and FsTOx, N1 is in the single format, and Ex1 corresponds to the single-format unbiased exponent of 52: Ex1=127 +52=179 (127 is the exponent bias in the ANSI/IEEE Standard 754-1985 single format). For FdTOi and FdTOx, Ex1 corresponds to the double-format unbiased exponent of 52: Ex2=52+1023=1075 (1023 is the exponent bias in the ANSI/IEEE Standard 754-1985 double format).

The shift amount ShA for the significand alignment is equal to |Ex1−Ex2|, where Ex2 is the exponent of the operand being converted.

For FsTOx, FdTOx, the result integer may have more than 53 significant bits. In this case the significand of the operand being converted is shifted left in normalization shifter 148 of subunit 120.1, and the result is selected from subunit 120.1 even if the operation is an effective addition. In all the other cases the result is delivered from rounding subunit 120.2 The result is delivered in a 64-bit field.

Unit 110 also executes:
 FsTOd—floating point single-to-double conversion;
 FdTOs—floating point double-to-single conversion.
 Instruction execution time is 3 cycles.

These instructions are implemented by adding the to-be-converted operand N2 with a floating point double-format operand N1 which has a zero sign, a zero fraction, a zero hidden bit, and an exponent Ex1 defined as follows. For FsTOd, Ex1=1151 which is −896 in one's complement form in an 11-bit field. For FdTOs, Ex1=896. Of note, 896=1023−127 is the difference between the double and single format exponent biases in ANSI/IEEE Standard 754-1985.

The result exponent is equal to |Ex1−Ex2|.

For FsTOd, the result is selected from subunit 120.1 even if the operation is an effective addition. If the operand being converted is denormalized, the result gets normalized.

For FdTOs, the result is selected from subunit 120.2. The result is rounded. The operand being converted is treated by subunit 120.2 as being in the single format. If Ex1≧Ex2 (i.e., ExRs2=0), the result is denormalized, and the UNDERFLOW exception is generated. If the result exponent is greater than 254, then infinity or the largest finite number is delivered depending on the rounding mode ModeR. If the result becomes denormalized, an additional right shift by one digit is done by COR_SHIFT circuit 160.1, because in this case the shift amount ShA from EXAD circuit 834 is less by 1 than needed. To generate the sticky bit in the case of a denormalized result, circuit StB2 generates two sticky bits: one sticky bit assuming the result is normalized, and the other sticky bit assuming the result is denormalized. The selection of the sticky bit is done by multiplexer MuxStb.

Unit 110 also executes:
 FiTOs—single integer to single floating-point conversion;
 FxTOs—double integer to single floating-point;
 FiTOd—single integer to double floating-point;
 FxTOd—double integer to double floating-point.
 Instruction execution time is 3 cycles.

These instructions are implemented in subunit 120.2 by adding the to-be-converted operand N2 to N1=0, where N1 is in the floating point double format.

Single integer operands N2 occupy 32 bits. Double integer operands N2 occupy 64 bits. Negative integer operands N2 are in two's complement form.

Conversion to a floating point format is accomplished by shifting the operand N2 until its most significant bit is in the hidden bit position. Accordingly, for positive integers N2, the unbiased exponent of the result is the number of the most significant "1" in the operand N2, where the bits are counted from right to left, that is, from the least significant bit to the most significant bit, starting with zero. For example, if N1=100 binary, the number of the most significant "1" is 2, and the unbiased exponent is also 2. For negative integers, the unbiased exponent is the number of the most significant "0" unless the integer is a power of 2, in which case the unbiased exponent is one greater than the number of the most significant "0".

Circuit Op2Cor (FIG. 7B) shifts operand N2 left so that N2's most significant digit ("1" if N2≧0, "0" if N2<0) is to the left of the hidden bit position 52. Then the right shifter 160.2 shifts the operand right so that the most significant digit gets into bit 52.

The shift amounts are determined as follows. Circuit Shint (FIG. 7A) divides the 64-bit operand N2 into four 16-bit groups. Circuit Shint determines the group that includes the most significant digit and provides the Shift amount CS to circuit Op2Cor. In response to CS, Op2Cor shifts N2 left and places the result into a 69-bit field [68:0] such that the group containing the most significant bit starts in bit 68.

The right bits are filled with non-significant digits ("0" if N2≧0, "1" if N2<0). Op2Cor is a four-input multiplexer selecting the result based on which of the four groups has the most significant digit.

Meanwhile, circuit Shint generates the shift amount Shi for shifter SHIFT 160.2 as follows. Shint finds the leading significant digit in each group, and generates for each group a version of Shi assuming that the group contains the most significant digit of N2. Then Shint determines the group containing the most significant digit of N2 and selects the Shi version generated for this group. Multiplexer MUXsh provides Shi as ShA to shifter 160.2. For instructions FADD, FSUB, multiplexer MUXsh selects ShA from EXAD 834.

Circuit Shint also generates signal Exb added to Shi by adder 899. The sum Shi+Exb is the exponent of the result. Multiplexer MUXle2 selects the result exponent from the output of adder 899 or the output of LE2 842 which provides the largest exponent for FADD and FSUB instructions.

Exb is generated as illustrated in Appendix 4.

While the invention has been illustrated with respect to the embodiments described above, other embodiments and variations are within the scope of the invention. For example, the invention is not limited to any particular floating point format or any particular exceptions. In some embodiments, floating point number representations do not include a hidden bit, and hence significands do not include hidden bits. In some embodiments, subunits 120.1, 120.2 share exponent adders and/or other circuitry. Other embodiments and variations are within the scope of the invention, as defined by the following claims.

APPENDIX 1

| Comp | MOD | SiRs | Gout = 0<br>Gs | Gout = 1<br>Ps |
|---|---|---|---|---|
| 0 | 0 | don't care | S[4] & S[3] & S[2] | S[4] & S[3] |
|  | 1 | don't care | don't care | don't care |
|  | 2 | 0 | S[4] & S[3] & (S[2] \| S[1] \| S[0]) | S[4] & (S[3] \| S[2] \| S[1] \| S[0]) |
|  |  | 1 | don't care | don't care |
|  | 3 | 0 | don't care | don't care |
|  |  | 1 | S[4] & S[3] & (S[2] \| S[1] \| S[0]) | S[4] & (S[3] \| S[2] \| S[1] \| S[0]) |
| 1 | 0 | don't care | S[4] & S[3] & S[2] & S[1] | S[4] & S[3] & S[2] |
|  | 1 | don't care | don't care | don't care |
|  | 2 | 0 | S[4] & S[3] & S[2] & (S[1] \| S[0]) | S[4] & S[3] & (S[2] \| S[1] \| S[0]) |
|  |  | 1 | don't care | don't care |
|  | 3 | 0 | don't care | don't care |
|  |  | 1 | S[4] & S[3] & S[2] & (S[1] \| S[0]) | S[4] & S[3] & (S[2] \| S[1] \| S[0]) |

APPENDIX 2

Comp = 0, MOD = 0.

| S[4] | S[3] | S[2] | S[1] | S[0] | Gs | Ps |
|---|---|---|---|---|---|---|
| 0 | 0 | 0 | 0 | 0 | 0 | 0 |
| . | . | . | . | . | 0 | 0 |
| . | . | . | . | . |  |  |
| . | . | . | . | . |  |  |
| 1 | 0 | 1 | 1 | 0 | 0 | 0 |
| 1 | 0 | 1 | 1 | 1 | 0 | 0 |
| 1 | 1 | 0 | 0 | 0 | 0 | 1 |
| 1 | 1 | 0 | 0 | 1 | 0 | 1 |
| 1 | 1 | 0 | 1 | 0 | 0 | 1 |
| 1 | 1 | 0 | 1 | 1 | 0 | 1 |
| 1 | 1 | 1 | 0 | 0 | 1 | 1 |
| 1 | 1 | 1 | 0 | 1 | 1 | 1 |
| 1 | 1 | 1 | 1 | 0 | 1 | 1 |
| 1 | 1 | 1 | 1 | 1 | 1 | 1 |

APPENDIX 3

| Comp | MOD | SiRs | RV when Gout = 0 | RV when Gout = 1 |
|---|---|---|---|---|
| 0 | 0 | don't care | Gr2 = ~Gout & S[2] & (S[3] \| S[1] \| S[0]) | Gr3 = Gout & S[3] & (S[4] \| S[2] \| S[1] \| S[0]) |
|  | 1 | don't care | don't care | don't care |
|  | 2 | 0 | Gr2 = ~Gout & (S[2] \| S[1] \| S[0]) | Gr3 = Gout & (S[3] \| S[2] \| S[1] \| S[0]) |
|  |  | 1 | don't care | don't care |
|  | 3 | 0 | don't care | don't care |
|  |  | 1 | Gr2 = ~Gout & (S[2] \| S[1] \| S[0]) | Gr3 = Gout & (S[3] \| S[2] \| S[1] \| S[0]) |
| 1 | 0 | don't care | Gr1 = ~Gout & S[1] & (S[2] \| S[0]) | Gr2 = Gout & S[2] & (S[3] \| S[1] \| S[0]) |
|  | 1 | don't care | don't care | don't care |
|  | 2 | 0 | Gr1 = ~Gout & (S[1] \| S[0]) | Gr2 = Gout & (S[2] \| S[1] \| S[0]) |
|  |  | 1 | don't care | don't care |
|  | 3 | 0 | don't care | don't care |

APPENDIX 3-continued

| Comp | MOD SiRs | RV when Gout = 0 | RV when Gout = 1 |
|------|----------|------------------|------------------|
|      | 1        | Gr1 = ~Gout & (S[1] \| S[0]) | Gr2 = Gout & (S[2] \| S[1] \| S[0]) |

APPENDIX 4

| Position of Most Significant Digit in N2[63:0] | | Exb (hexadecimal) | |
|---|---|---|---|
| | | single-format result | double-format result |
| 63–48 | | AE | 42E |
| 47–32 | | 9E | 41E |
| 31–16 | | 8E | 40E |
| 15–0 | | 7E | 3FE |
| No Significant Digits in N2 | Comp = 1 | 7F | 3FF |
| | Comp = 2 | 0 | 0 |

We claim:

1. A floating point unit comprising:
an input for receiving a plurality of floating point operands;
a first subunit for adding the floating point operands and providing a result of the addition;
a second subunit for adding the floating point operands and providing a result of the addition; and
a multiplexer for selecting:
the result from the first subunit if the addition operation comprises an effective subtraction of operands which either (1) have equal exponents, or (2) have exponents which differ by 1 and for which the result of the addition operation is to be shifted to be normalized;
the result from the second subunit if the addition operation comprises an effective addition, or if the addition operation comprises an effective subtraction of operands for which one of the following conditions is true: (1) the operands' exponents differ by 1 and the addition operation provides a normalized result without normalization, or (2) the operands' exponents differ by more than 1.

2. The floating point unit of claim 1 wherein the first subunit does not include circuitry for rounding a result.

3. The floating point unit of claim 1 wherein the second subunit is for providing a rounded result.

4. The floating point unit of claim 3 wherein the floating point unit satisfies ANSI/IEEE Standard 754-1985.

5. The floating point unit of claim 3 wherein the second subunit has an input for receiving a signal indicating a rounding mode, the rounding mode being one of a group comprising one or more of the following four rounding modes specified in ANSI/IEEE Standard 7541985: (i) "round to nearest", (ii) "round toward +∞", (iii) "round toward −∞", and (iv) "round toward zero", the second subunit comprising circuitry for rounding a result according to the signal indicating the rounding mode.

6. The floating point unit of claim 3 wherein in the second subunit, rounding of a significand of the result is overlapped with adding significands of the operands.

7. The floating point unit of claim 3 wherein the second subunit comprises:
a first adder for adding the least significant bits of the significand of one operand to the least significant bits of the significand of another operand and for generating a first sum which does not take rounding into account;
a second adder for adding: (1) the most significant bits of the significand of one operand, (2) the most significant bits of the significand of another operand, (3) the carry from the first sum, and (4) a rounding carry into the most significant bits which is generated to round the sum of the significands of the operands; and
a third adder for correcting the first sum for rounding.

8. The floating point unit of claim 7 further comprising circuitry for generating the rounding carry so as to take account of normalization and overflow in the second subunit.

9. The floating point unit of claim 7 wherein the second adder operates in parallel with the first and third adders.

10. The floating point unit of claim 7 wherein the least significant bits added by the first adder include one or more lost precision bits and one or more bits which are not lost precision bits.

11. The floating point unit of claim 1 wherein the first and second subunits are for operating in parallel with each other.

12. The floating point unit of claim 1 further comprising a circuit for aligning significands of operands having unequal exponents.

13. A method for adding a plurality of floating point operands, the method comprising:
receiving the operands at an input of an addition unit;
adding the operands by the addition unit to provide a first result, the first result being a correct result if the following condition (I) is true:
(I) the addition operation comprises an effective subtraction of operands which either (1) have equal exponents, or (2) have exponents which differ by 1 and for which the result of the addition operation is to be shifted to be normalized;
adding the operands by the addition unit to provide a second result, the second result being a correct result if the following condition (II) is true:
(II) the addition operation comprises an effective addition, or the addition operation comprises an effective subtraction of operands for which one of the following conditions is true: (1) the operands' exponents differ by 1 and the addition operation provides a normalized result without normalization, or (2) the operands, exponents differ by more than 1; selecting the first result if the condition (I) is true; and
selecting the second result if the condition (II) is true.

14. The method of claim 13 wherein adding the operands to provide the second result does not comprise rounding.

15. The method of claim 13 wherein adding the operands to provide the second result comprises rounding by the addition unit so that the second result is rounded.

16. The method of claim 15 wherein rounding is overlapped with adding significands of the operands.

17. The method of claim 13 wherein adding the operands to provide the second result comprises:
adding by the addition unit the least significant bits of the significands of the operands, the least significant bits including lost precision bits and bits that are not lost precision bits;
determining by the addition unit a rounding carry from the least significant bits into the most significant bits of the operands, the rounding carry taking into account overflow and normalization; and
adding by the addition unit the most significant bits with the rounding carry.

18. The method of claim 13 wherein adding the operands to provide a first result is done in parallel with adding the operands to provide a second result.

19. The method of claim 13 further comprising aligning significands of operands having unequal exponents.

20. A method for providing a floating point unit, the method comprising:

providing an input for receiving a plurality of floating point operands;

providing a first subunit for adding the floating point operands and providing a result of the addition;

providing a second subunit for adding the floating point operands and providing a result of the addition; and providing a multiplexer for selecting:

the result from the first subunit if the addition operation comprises an effective subtraction of operands which either (1) have equal exponents, or (2) have exponents which differ by 1 and for which the result of the addition operation is to be shifted to be normalized;

the result from the second subunit if the addition operation comprises an effective addition, or if the addition operation comprises an effective subtraction of operands for which one of the following conditions is true: (1) the operands' exponents differ by 1 and the addition operation provides a normalized result without normalization, or (2) the operands' exponents differ by more than 1.

21. The method of claim 20 wherein the second subunit is for providing a rounded result.

22. The method of claim 20 wherein providing the second subunit comprises:

providing a first adder for adding the least significant bits of the significand of one operand to the least significant bits of the significand of another operand and for generating a first sum which does not take rounding into account;

providing a second adder for adding: (1) the most significant bits of the significand of one operand, (2) the most significant bits of the significand of another operand, (3) the carry from the first sum, and (4) a rounding carry into the most significant bits which is generated to round the sum of the significands of the operands; and providing a third adder for correcting the first sum for rounding.

23. The method of claim 22 further comprising providing circuitry for generating the rounding carry so as to take account of normalization and overflow in the second subunit.

24. The method of claim 20 wherein the first and second subunits are for operating in parallel with each other.

25. A floating point unit comprising:

an input for receiving a plurality of floating point operands; and a circuit for providing a result of an addition operation on the floating point operands for a case when the addition operation comprises an effective subtraction of operands with unequal exponents or an effective addition, the circuit comprising:

a circuit for generating a complement signal which is equal to 1 if, and only if, the addition operation comprises an effective subtraction;

a circuit responsive to the complement signal, for generating a one's complement of a significand of a first operand of the effective subtraction, wherein the first operand has a smaller exponent than a second operand of the effective subtraction; and an adder for adding: (1) the complement signal, (2) the one's complement of the significand of the first operand, and (3) the significand of the second operand, wherein the complement signal is to be added as an end-around carry.

26. A method for adding floating point operands, the method comprising:

receiving the operands at an input of an addition unit; and generating a result of an addition operation on the floating point operands for a case when the addition operation comprises an effective subtraction of operands with unequal exponents or an effective addition, where generating this result comprises:

generating a complement signal which is equal to 1 if, and only if, the addition operation comprises an effective subtraction;

in response to the complement signal, generating a one's complement of a significand of a first operand of the effective subtraction, wherein the first operand has a smaller exponent than a second operand of the effective subtraction; and adding: (1) the complement signal, (2) the one's complement of the significand of the first operand, and (3) the significand of the second operand, wherein the complement signal is added as an end-around carry.

* * * * *